(12) United States Patent
Chmiel

(10) Patent No.: US 8,631,335 B2
(45) Date of Patent: Jan. 14, 2014

(54) INTERACTIVE ELEMENT MANAGEMENT IN A WEB PAGE

(75) Inventor: Matthew S. Chmiel, Ottawa (CA)

(73) Assignee: International Business Machines Corporation, Armonk, NY (US)

(\*) Notice: Subject to any disclaimer, the term of this patent is extended or adjusted under 35 U.S.C. 154(b) by 303 days.

(21) Appl. No.: 13/188,659

(22) Filed: Jul. 22, 2011

(65) Prior Publication Data

US 2012/0102416 A1 Apr. 26, 2012

(30) Foreign Application Priority Data

Oct. 25, 2010 (CA) .................................. 2718180

(51) Int. Cl.
*G06F 3/00* (2006.01)

(52) U.S. Cl.
USPC ............ 715/760; 715/749; 715/765; 345/660

(58) Field of Classification Search
USPC ................. 715/749, 760, 764, 765, 821, 835; 345/660, 661
See application file for complete search history.

(56) References Cited

U.S. PATENT DOCUMENTS

| | | | |
|---|---|---|---|
| 7,652,779 B2 | 1/2010 | Wu et al. | |
| 2004/0221002 A1 | 11/2004 | Karim | |
| 2006/0123340 A1* | 6/2006 | Bailey et al. ................... | 715/700 |
| 2006/0242126 A1 | 10/2006 | Fitzhugh | |
| 2009/0006610 A1 | 1/2009 | Venable | |

FOREIGN PATENT DOCUMENTS

| | | |
|---|---|---|
| EP | 2 120 163 A2 | 11/2009 |
| WO | 01/39046 A1 | 5/2001 |

OTHER PUBLICATIONS

International Search Report and Written Opinion from corresponding PCT Application Serial No. PCT/EP2011/068360 dated Feb. 14, 2012 (8 pages).
Panayiotis Mavrommatis: "Flashblock for Android (not needed)", retrieved from the internet on Nov. 18, 2011: URL:http://blog.isovitis.com/2010/05/flash block-for-android-not-needed.html, published on May 23, 2010 (1 page).
Gina Trapani, "Android 2.2 Screenshots: My Favorite Features in Froyo", retrieved from the internet on Nov. 18, 2011: URL:http://smarterware.org/6085/android-2-2-screenshot-tour-my-favorite-features-in-froyo, published on May 23, 2010 (11 pages).
Reinhard Wolfinger et al., "A Component Plug-in Architecture for the .NET Platform," JMLC (20 pages) 2006.

\* cited by examiner

*Primary Examiner* — Xiomar L Bautista
(74) *Attorney, Agent, or Firm* — Shumaker & Sieffert, P.A.

(57) ABSTRACT

An illustrative embodiment of a computer-implemented method for plug-in re-use in a web page for simulated simultaneous interactive elements, determines whether an interactive element is a plug-in instance on a web page and responsive to a determination that the interactive element is not a plug-in instance on a web page, requests current state information of the interactive element from the web page. The computer-implemented method loads the current state information into an available plug-in instance on the web page, positions and sizes the available plug-in instance on top of the interactive element on the web page and enables interaction with the interactive element.

20 Claims, 6 Drawing Sheets

INTERACTIVE ELEMENT MANAGEMENT IN A WEB PAGE

TECHNICAL FIELD

This disclosure relates generally to dynamic content processing in a data processing system.

BACKGROUND

Due to technical limitations in typical modern browsers, having many (for example, more than 10 to 15) separate interactive browser plug-in-based elements open on a single web page is typically impossible. When many interactive plug-in based elements are present on a single web page, the interactive plug-in based elements must usually be grouped into one or more plug-in instances. The current technique may be a satisfactory approach for web pages built entirely using a plug-in technology, for example, Adobe® Flash® technology[1] but the solution does not translate well when using hypertext markup language (HTML)-based web pages. Using the HTML-based web pages would require adopting plug-in technology to render parts of the web page larger than what is required to serve the function of the part.

[1] Adobe and Flash are either registered trademarks or trademarks of Adobe Systems Incorporated in the United States and/or other countries.

For example, when providing user interaction on many Adobe® Flash® technology based charts rendered as separate instances on a single HTML-based web page in a business intelligence (BI) web application, the BI reports rendered primarily in HTML only support a limited number of interactive Flash technology based charts. The limitation of the Web browser support typically causes a browser failure when too many interactive elements are used within the web page.

BRIEF SUMMARY

According to one embodiment, a computer-implemented method includes, responsive to determining that an interactive element is not a plug-in instance on a web page, requesting, by a computing device, current state information of the interactive element from the web page. The computer-implemented method also loads, by the computing device, the current state information into an available plug-in instance on the web page. The computer-implemented method also positions and sizes, by the computing device, the available plug-in instance on top of the interactive element on the web page. The computer-implemented method further enables, by the computing device, interaction with the interactive element According to another embodiment, a computer program product for plug-in re-use in a web page for simulated simultaneous interactive elements includes a computer recordable-type media containing computer executable program code stored thereon. The computer recordable-type media includes computer executable program code to determine whether an interactive element is a plug-in instance on a web page. The computer recordable-type media includes computer executable program code to, responsive to a determination that the interactive element is not a plug-in instance on a web page, request current state information of the interactive element from the web page. The computer recordable-type media includes computer executable program code to load the current state information into an available plug-in instance on the web page. The computer recordable-type media includes computer executable program code to position and size the plug-in instance on top of the interactive element on the web page. The computer recordable-type media includes computer executable program code to enable interaction with the interactive element.

According to another embodiment, an apparatus includes a communications bus, a memory connected to the communications bus, wherein the memory contains computer executable program code, a communications unit connected to the communications bus, an input/output unit connected to the communications bus, a display connected to the communications bus and a processor unit connected to the communications bus. The processor unit executes the computer executable program code to, responsive to a determination that an interactive element is not a plug-in instance on a web page, request current state information of the interactive element from the web page. The processor unit further executes the computer executable program code to direct the apparatus to load the current state information into an available plug-in instance on the web page, position and size the available plug-in instance on top of the interactive element on the web page, and enable interaction with the interactive element.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
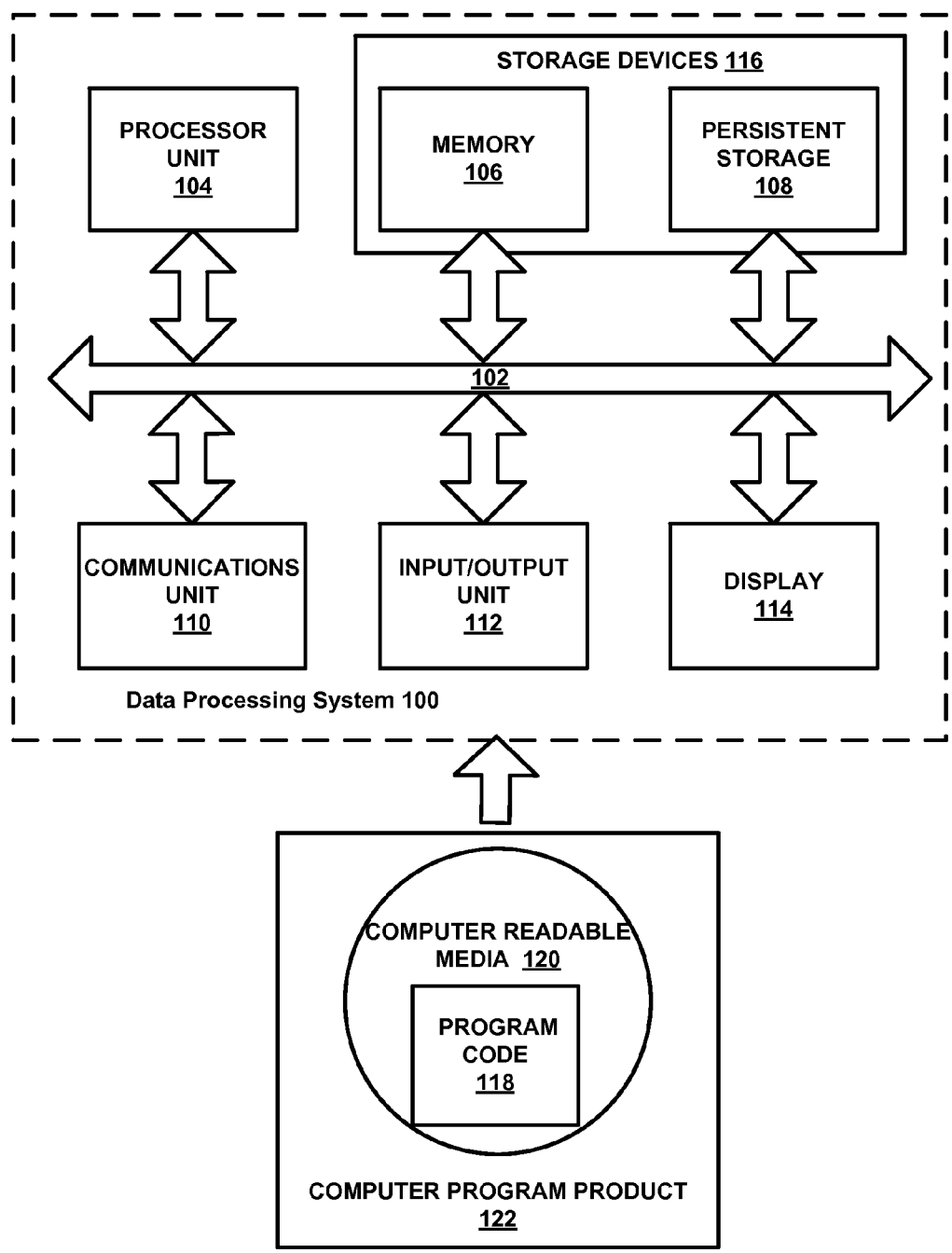
FIG. 1 is a block diagram of an example data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational acts to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications bus 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications bus 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications bus 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications bus 102.

According to an illustrative embodiment, a computer-implemented process for plug-in re-use in a web page for simulated simultaneous interactive elements is presented. Illustrative embodiments propose a solution to a browser limitation on a number of separate interactive plug-in-based elements on a web page (which usually manifests as freezing or crashing of the browser). Illustrative embodiments leverage one (or several) plug-in instance(s) to provide interactivity in one (or several) elements at a time on the web page, but do not limit a number of plug-in-based interactive elements on a web page. An embodiment of the computer-implemented process delivers the capability imperceptibly to a user of the web page.

Using data processing system 100 of FIG. 1 as an example, an illustrative embodiment provides a computer-implemented process stored in memory 106, executed by processor unit 104, for plug-in re-use in a web page for simulated simultaneous interactive elements. Processor unit 104 determines whether an interactive element is a plug-in instance on a web page and responsive to a determination that the interactive element is not a plug-in instance on a web page, requests current state information of the interactive element from the web page. Processor 104 loads the current state information into a plug-in instance available on the web page, positions and sizes the plug-in instance on top of the interactive element on the web page and enables interaction with the interactive element.

In an alternative embodiment, program code 118 containing the computer-implemented method for plug-in re-use in a web page for simulated simultaneous interactive elements may be stored within computer readable media 120 as computer program product 122. In another illustrative embodiment, the process for plug-in re-use in a web page for simulated simultaneous interactive elements may be implemented in an apparatus comprising a communications bus, a memory connected to the communications bus, wherein the memory contains computer executable program code, a communications unit connected to the communications bus, an input/output unit connected to the communications bus, a display connected to the communications bus, and a processor unit connected to the communications bus. The processor unit of the apparatus executes the computer executable program code to direct the apparatus to perform the process.

Figure 2:
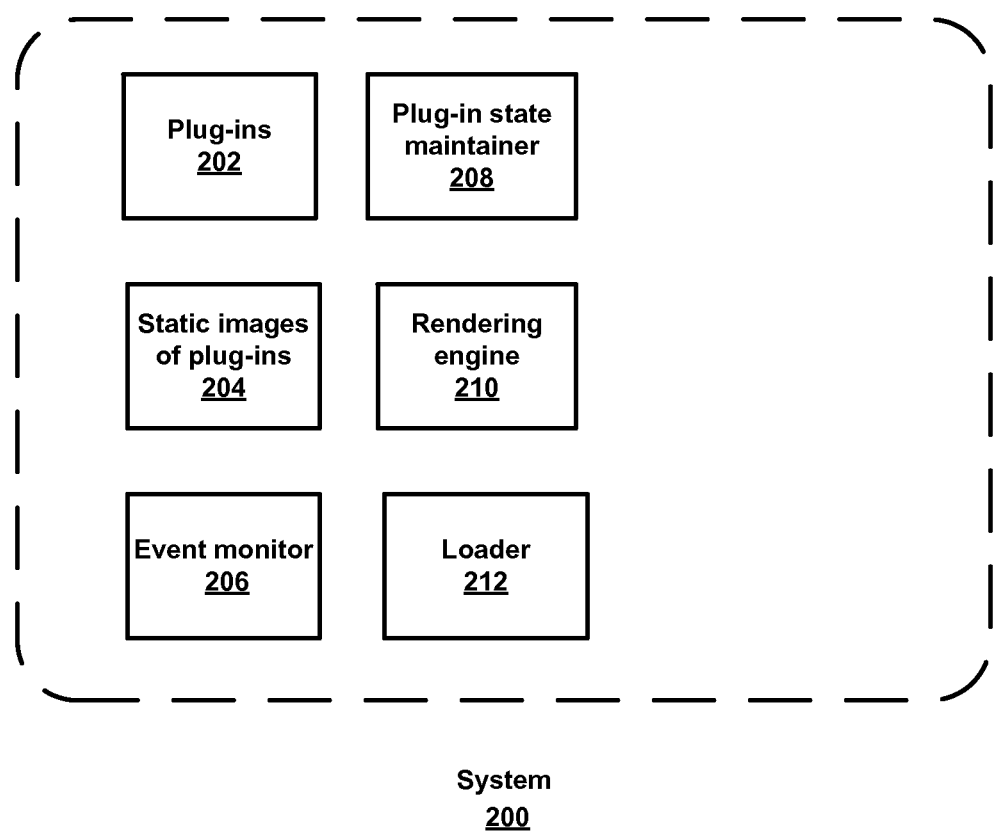
FIG. 2 is a block diagram of components of a plug-in management system, in accordance with various embodiments of the disclosure.

With reference to FIG. 2, a block diagram of components of a plug-in management system, in accordance with various embodiments of the disclosure is presented. Techniques of the present disclosure may provide a user with better interactive element management for increased numbers of interactive elements used within the web page is required. System 200 is an example of an interactive element management system including a number of components comprising plug-ins 202, static images of plug-ins 204, event monitor 206, plug-in state maintainer 208, rendering engine 210 and loader 212. System 200 is integrated with a data processing system such as data processing 100 of FIG. 1 for provision of underlying support services.

Plug-ins 202 are a set of interactive elements comprising one or more elements. Interactive elements are elements on a web page that can be manipulated by user interaction resulting in a modified view of the content in the element. Modification can include various operations including filtering data on a chart to modify the chart display, interacting with an advertisement to get details on a product being offered, or playing a video.

Static images of plug-ins 204 are images of a plug-in representing exactly (or resembles very closely) what a rendering by a plug-in will be at a point in time. For example, when a video has been viewed and paused a static image of the video would be an image at the point in which the video was stopped.

Event monitor 206 represents a listener that continuously waits for a focus event to occur for an interactive element of a web page. When a focus event is encountered, an action may be triggered depending upon the situation of the interactive element state at the time of the event. Event monitoring is typically handled by a web browser enabling system 200 to respond to event notifications sent from the browser, including a mouse over event, or key press event.

Plug-in state maintainer 208 represents a storage location in which state information regarding a plug-in instance can be maintained. For example, a plug-in state maintainer may save state information associated with the plug-in element in the plug-in or an area of the web page associated with the plug-in.

Rendering engine 210 provides a capability to present the image of a requested plug-in element for interactive use or as a static image. Typically the same rendering engine used to produce the images of a web page may be used rather than a separate rendering engine.

Loader 212 provides a capability to instantiate images for requested static images or the plug-ins. Images are retrieved from a storage location as needed by the web page.

System 200 provides a capability to re-use one (or several) interactive plug-in instances on a single web page, to deliver functionality of many more interactive elements than could be supported by a browser. By leveraging the technical abilities of many plug-ins to render a current view state as a static image, and an ability of a modern browser to render images on a web page from image data directly (base64 encoded) a web page can replace interactive elements on the page with identical visual representation, when the plug-ins are not being interacted with by a user. Using an embodiment of system 200 a user will be unaware all interactive elements are not simultaneously user-interactive (which requires a plug-in instance). Swapping between static images and plug-in instances occurs seamlessly from a perspective of the user.

Figure 3:
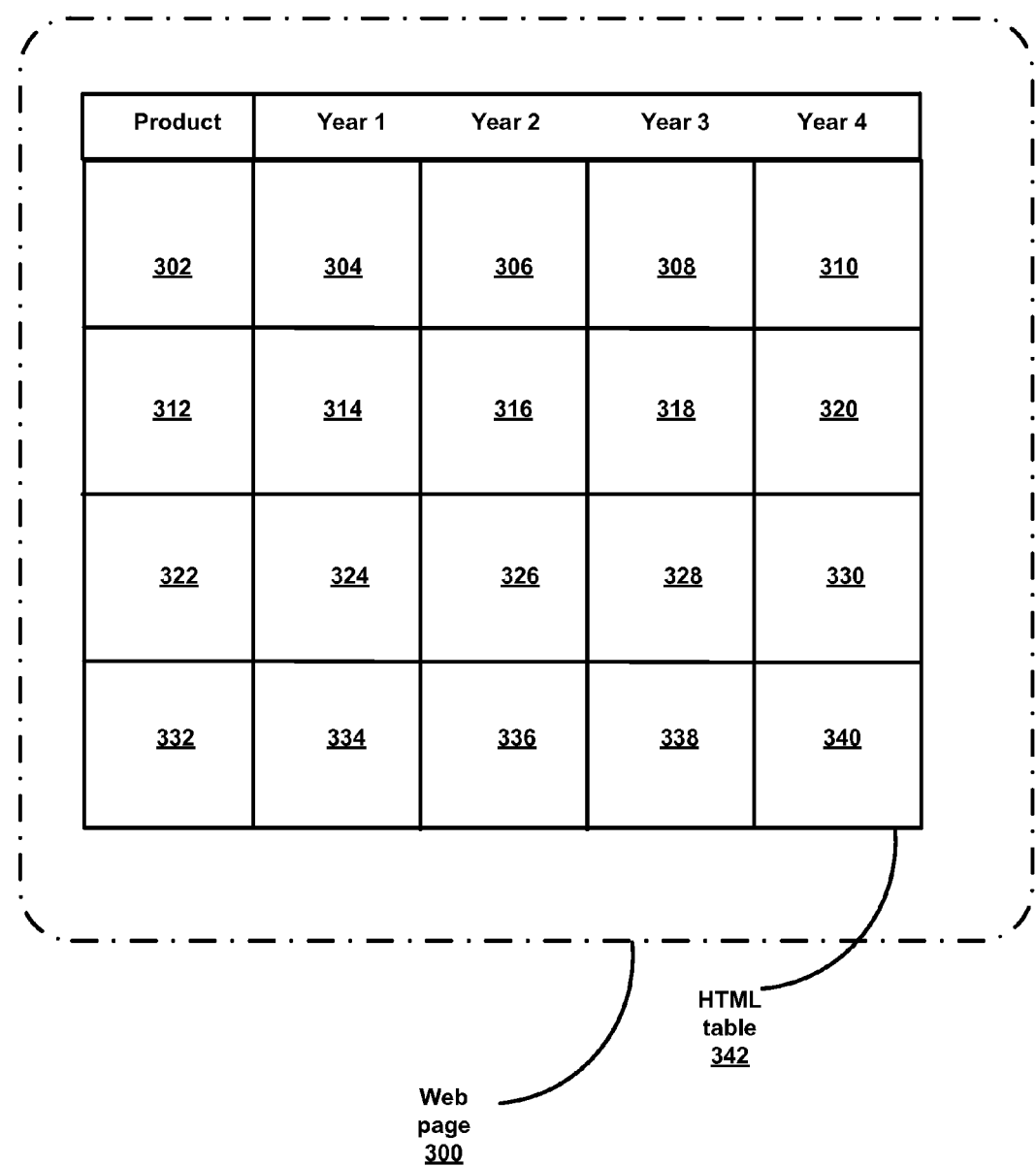
FIG. 3 is a block diagram of an HTML-based page with a set of charts, in accordance with various embodiments of the disclosure.

With reference to FIG. 3, a block diagram of an HTML-based page with a set of charts, in accordance with one embodiment of the disclosure is presented. HTML table 342 is an example of a set of charts represented in web page 300.

HTML table 342 has a header row defining a set of columns describing a product and a year 1 through year 4. Each cell in grid of HTML table 342 represents a respective chart depicting a chart image comprising information from the intersection of a product and a year. The example of the matrix chart-like configuration on web page 300 depicts 20 separate charts in cells 302 through 340 in HTML table 342. When the 20 separate charts are implemented for example as charts using an interactive technology concurrently, the relatively simple web page would typically fail to open in a web browser. However when implemented as static images, the interactivity possibilities of the web page are limited.

Using a process supported by system 200 of FIG. 2, to provide interactivity on each chart selectively in this example, the charts can be rendered initially as static images, and replaced, for example, with fully-interactive Flash technology based plug-in versions when a user rolls over a specific chart with a mouse cursor.

Figure 4:
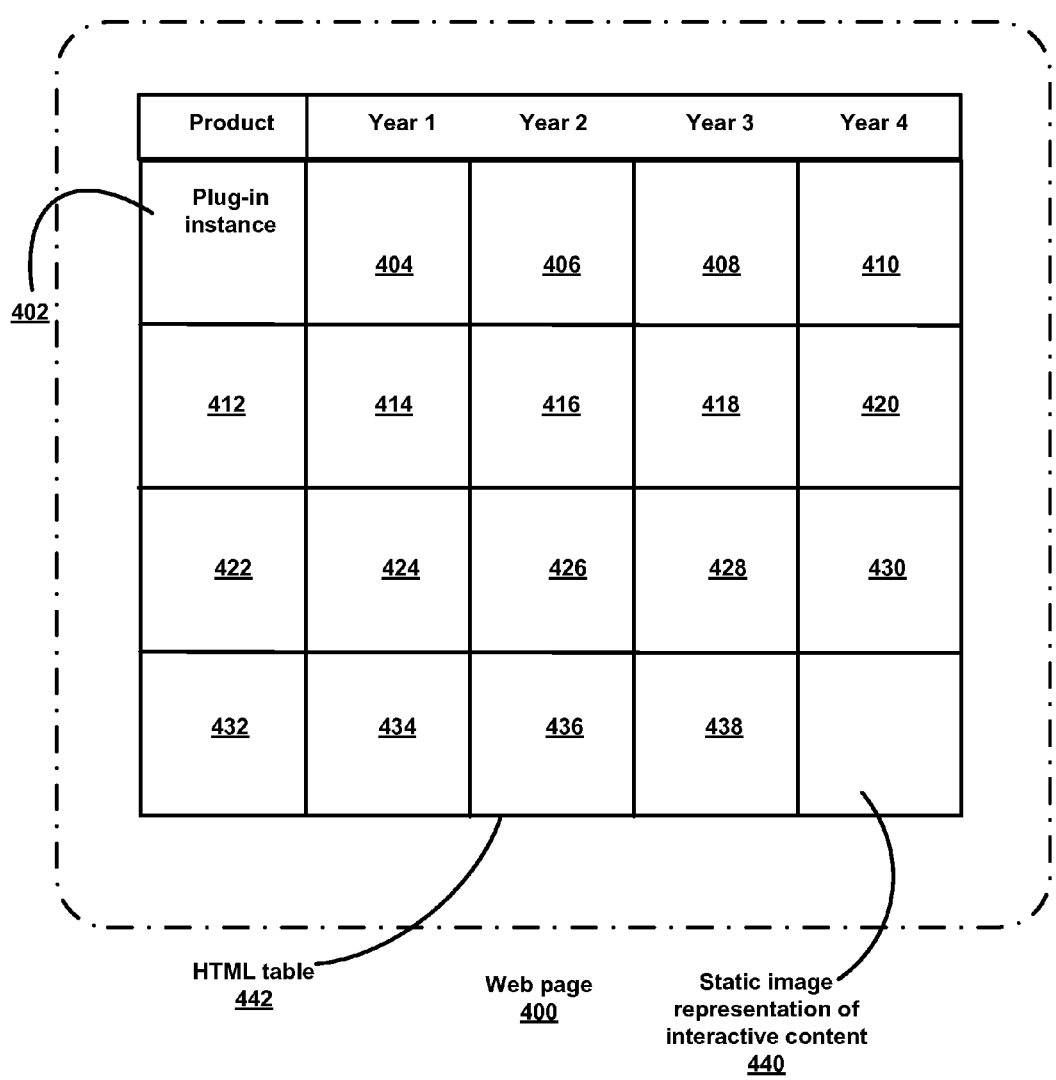
FIG. 4 is a block diagram of interactive elements of the HTML-based page of FIG. 3, in accordance with various embodiments of the disclosure.

With reference to FIG. 4, a block diagram of interactive elements of the HTML-based page of FIG. 3, in accordance with one embodiment of the disclosure is presented. Web page 400 is an example of a web page using an embodiment of system 200 of FIG. 2 in the charts of HTML table 342 of FIG. 3.

Web page 400 comprises a set of charts in a grid layout as in web page 300 of FIG. 3. A cell in HTML table 442 can be represented by either a static element or a plug-in instance of an interactive element. Plug-in instance of cell 402 represents an interactive element rather than a static element, providing a dynamic presentation to a user. Cell 440 is a static image representation of interactive content. Cell 402 through cell 440 may be representative of either a static image representation of interactive content or a plug-in instance as needed and supported by the implementing browser capability.

An embodiment of system 200 of FIG. 2 is used to manage the selection and change of state between a static representation and interactive representation of a cell in the example web page.

Because only one plug-in instance or several plug-in instances are required on web page 400, web page 400 can support many more interactive plug-in based elements as would be possible when each interactive element is a plug-in instance. Use of the disclosed process and components of system 200 of FIG. 2 is typically beneficial when large portions of, or an entire web page cannot or should not be converted to a plug-in technology, which is the case with many HTML-based web pages.

Typically web pages render images through image tags or background image styles that reference bitmap image data stored on a web server. Current web browsers can also render images through image tags and background image styles that reference bitmap image data directly, usually stored in a base64-encoded format.

Many web browser plug-in technologies have a capability to render a current view state as a bitmap image. This capability can be accessed through an application-programming interface (API) and can be coded to enable the view state to be rendered as an image on-demand. An example of a plug-in technology with this capability is Adobe Flash technology.

Through JavaScript™[2] and cascading style sheets (CSS) web page technologies, a plug-in instance, such as that in cell 402, can be hidden, shown, relocated and resized anywhere on a web page programmatically or in response to a user interaction. Communication between JavaScript and the plug-in can be facilitated through an API provided by the plug-in technology.

Usage of HTML table 442 on Web page 400 can leverage one or more plug-in instances (but less than would crash the web browser). Each additional plug-in instance equates to another additional interactive element on web page 400 that can be simultaneously interactive. For example, when three plug-in instances are used, three Flash technology videos may be playing simultaneously. In another example, when a single plug-in instance was used, such as in cell 402, then only one Flash technology based chart could be interacted with at a time. Illustrative embodiments using system 200 of FIG. 2 accordingly provide a perception to a user all interactive elements on web page 400 are simultaneously interactive, however only one (or several) are at any one time.

JavaScript is a trademark of Oracle and/or its affiliates.

Figure 5:
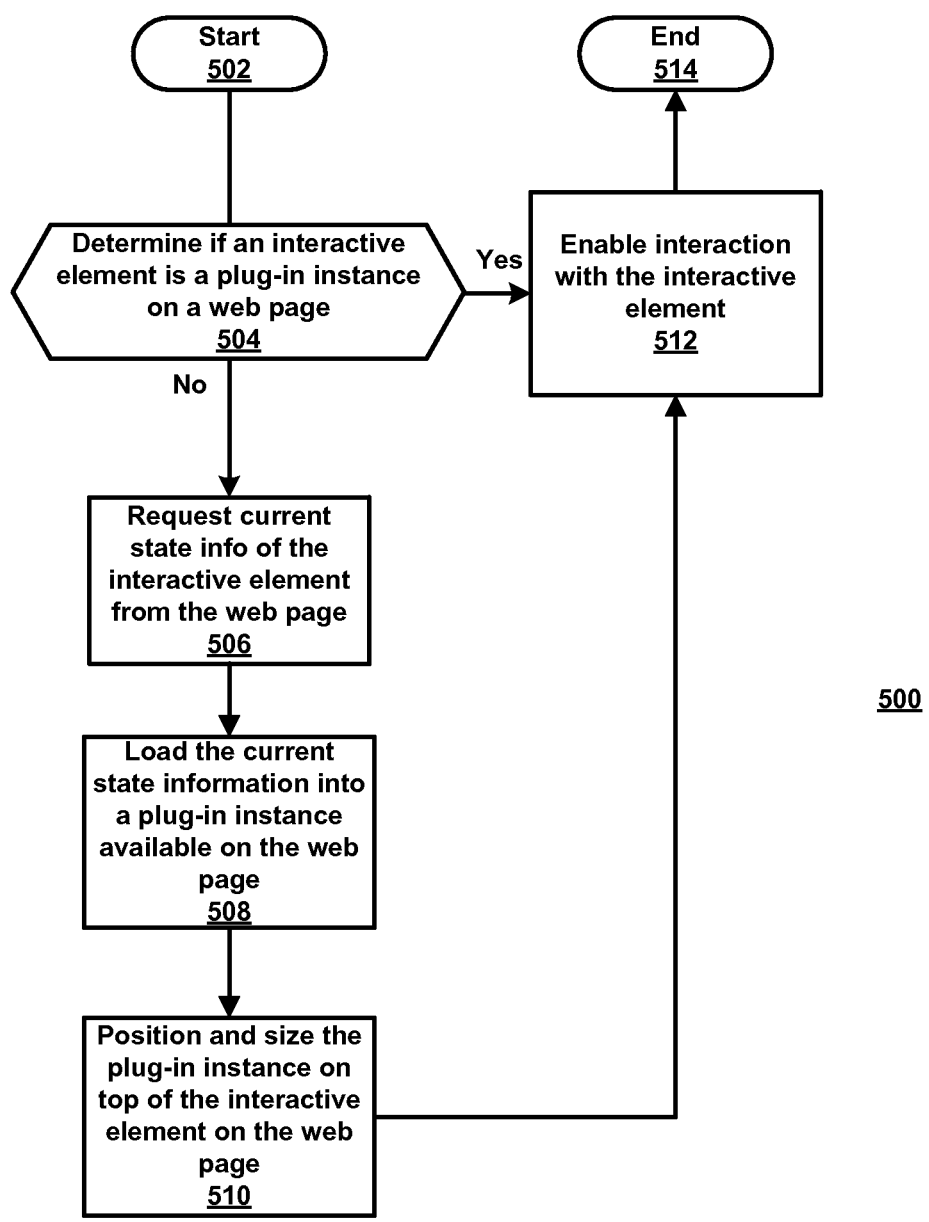
FIG. 5 is a flowchart of a method for enabling user interaction with an interactive element of FIG. 4, in accordance with various embodiments of the disclosure.

With reference to FIG. 5, a flowchart of a process for enabling user interaction with an interactive element of FIG. 4, in accordance with one embodiment of the disclosure is presented. Process 500 is an example of a process for managing plug-in re-use in a web page for simulated simultaneous interactive elements using system 200 of FIG. 2.

Each interactive element on a web page must be rendered as either a plug-in instance, or a static image that represents exactly (or resembles very closely) the rendering by the plug-in. A decision what to render directly in a plug-in instance or as static images can be optimized to a predetermined criteria including what a user is mostly likely to interact with most often, or first. Interactive elements rendered as static images must also specify an internal state, comprising all information/data required to recreate an interactive version in the plug-in instance.

Rendering of static images for interactive content can be created by a plug-in instance rendering the initial static content versions for all possible interactive elements on the page. Another possibility creates static images on a server and loading the static images on the web page.

Irrespective of an initial page rendering approach used, when the page has completed loading there will be static images exactly replicating (or approximating) the interactive elements in all desired locations on the web page where plug-in instances are not being used.

For each interactive element on the web page to become interactive the static image representation may be replaced with interactive plug-in instances. There are many ways to determine which interactive elements should be replaced by the plug-in from the static image. In most cases, interactive elements leveraging the plug-in instance would be ones that have the focus or attention of the user. A determination of which elements have the attention of the user include the elements that are currently visible on the page (not elements that are scrolled off the page), elements that are closer to the mouse location of the user, elements that have keyboard focus, or elements that the user rolls over with the mouse cursor.

Method 500 begins (act 502) and determines whether an interactive element is a plug-in instance on a web page (act 504). Responsive to a determination that the interactive element is a plug-in instance on a web page, method 500 enables interaction with the interactive element (act 512) and terminates thereafter (act 514).

Responsive to a determination that the interactive element is not a plug-in instance on a web page, method 500 requests current state information of the interactive element from the web page (act 506). Application programming interfaces supporting the request are provided. Method 500 loads the current state information into a plug-in instance available on the web page (act 508). The plug-in instance is selected using the positioning of the user selection, typically a mouse pointer over an interactive element of the web page.

Method 500 positions and sizes the plug-in instance on top of the interactive element on the web page (act 510). The positioning and sizing effectively hides the interactive element from view by the user. Having placed the plug-in instance on top of the interactive element on the web page, method 500 performs acts 512 and 514 as before.

Figure 6:
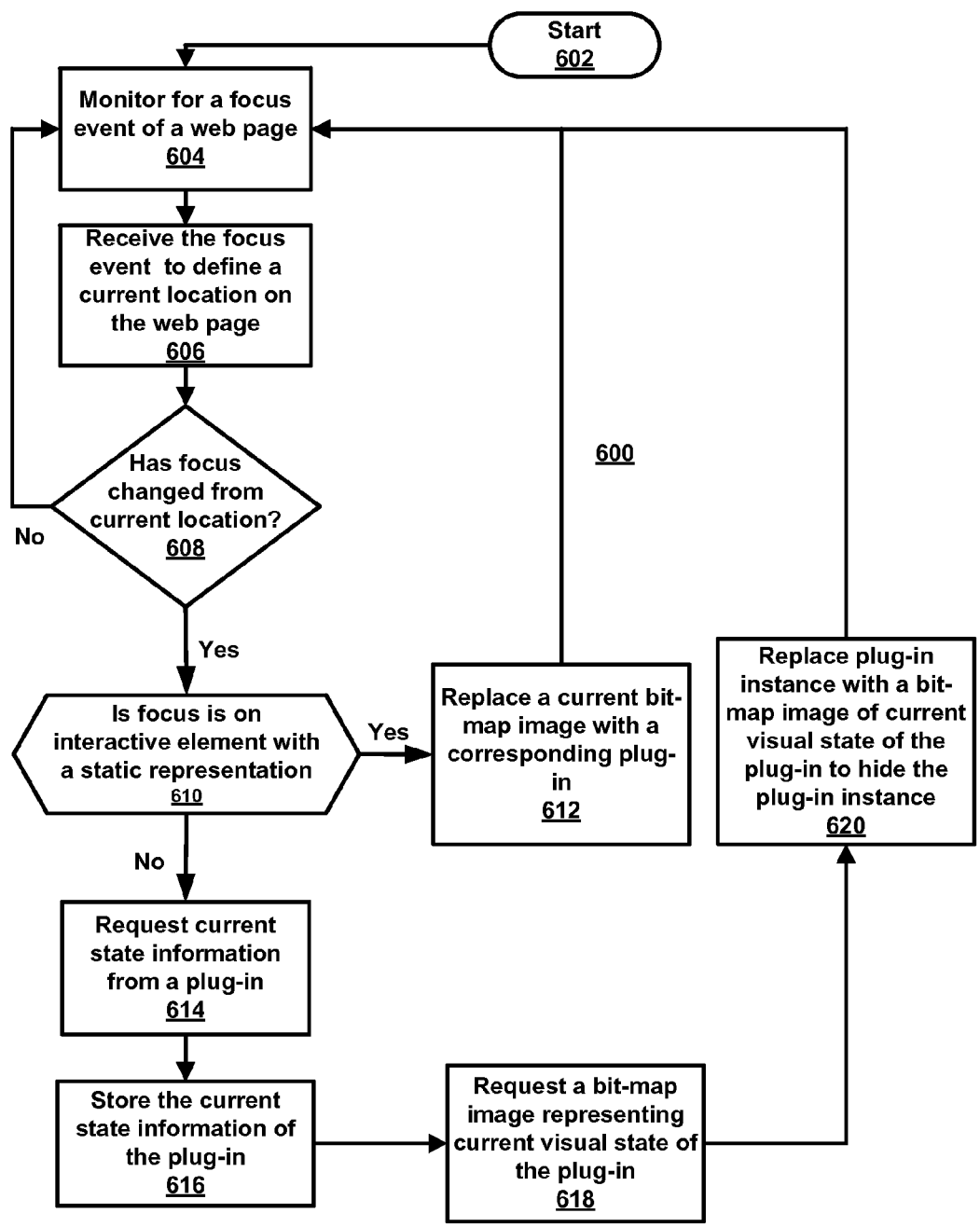
FIG. 6 is a flowchart of a method for enabling user interaction with a set of interactive elements of FIG. 5, in accordance with various embodiments of the disclosure.

With reference to FIG. 6, a flowchart of a process for enabling user interaction with a set of interactive elements of FIG. 5, in accordance with one embodiment of the disclosure is presented. Method 600 is an example of a sequence of operations using a set of interactive elements of FIG. 5.

Method 600 maintains an illusion to the user that all elements remain interactive. When a plug-in is pulled from an interactive element (to enable interactivity on another interactive element), a static image replacing the plug-in must represent a view state from the plug-in. Replacement is accomplished by calling into the plug-in through an API from the web page. The plug-in, in response to the call, generates a static image representing the current visual state and return the static to the web page. The web page places the image in the location of the plug-in instance. The swapping operation is imperceptible to the user. The plug-in instance also returns internal state information of the plug-in to be stored in the web page.

The previous operations may be further understood with the following description of method 600. Method 600 begins (act 602) and monitors for a focus event of a web page (act 604). Event monitoring is typically handled by a web browser enabling system 200 of FIG. 2 to respond to event notifications sent from the browser, including a mouse over event, or key press event.

Method 600 receives a focus event notification to define a current location on the web page (act 606). Method 600 determines whether the focus has changed from the current location (act 608).

Responsive to a determination that the focus has not changed from the current location, method 600 loops back to perform monitor for focus events in act 604 as before. Responsive to a determination that the focus has changed from the current location, method 600 determines whether the focus is on an interactive element with a static representation (act 610). Responsive to a determination that the focus is on an interactive element with a static representation, method 600 replaces a current bit-map image with a corresponding plug-in instance (act 612). Method 600 replaces the image, for example of a chart, with a plug-in representation, by loading the state of chart from the web page into the plug-in. The plug-in is placed in the same location and sized to match the static image enabling the user to interact with the chart, changing the display. The replacement operation is imperceptible to the user. Method 600 performs act 604 as before.

Responsive to a determination that the focus is not on an interactive element with a static representation, method 600 requests current state information from the plug-in (ct 614). Method 600 stores the current state information from the plug-in (act 616). Storing may be in the form of saving the current state information in the web page or other location including the plug-in.

Method 600 requests a bitmap image representing a current visual state of the plug-in (act 618). Method 600 replaces the plug-in instance with the bit-map image representing the current visual state of the plug-in to hide the plug-in instance (act 620). Method 600 performs act 604 as before.

Thus is provided in one embodiment a computer-implemented process for plug-in re-use in a web page for simulated simultaneous interactive elements. The computer implemented process determines whether an interactive element is a plug-in instance on a web page and responsive to a determination that the interactive element is not a plug-in instance on a web page, requests current state information of the interactive element from the web page. The computer-implemented process loads the current state information into a plug-in instance available on the web page, positions and sizes the plug-in instance on top of the interactive element on the web page and enables interaction with the interactive element.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

An example of the disclosure can take the form of an entirely hardware embodiment, an entirely software embodiment or an embodiment containing both hardware and software elements. In a preferred embodiment, an example of the disclosure is implemented in software, which includes but is not limited to firmware, resident software, microcode, and other software media that may be recognized by one skilled in the art.

It is important to note that while examples of the present disclosure have been described in the context of a fully functioning data processing system, those of ordinary skill in the art will appreciate that the methods of the present disclosure are capable of being distributed in the form of a computer readable medium of instructions and a variety of forms and that the present disclosure applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present disclosure has been presented for purposes of illustration and description, and is not intended to be exhaustive or limited to the disclosed in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer-implemented method comprising:
   responsive to determining that an interactive element is not a plug-in instance on a web page, requesting, by a computing device, current state information of the interactive element from the web page;
   loading, by the computing device, the current state information into an available plug-in instance on the web page;
   positioning and sizing, by the computing device, the available plug-in instance on top of the interactive element on the web page; and
   enabling, by the computing device, interaction with the interactive element.

2. The computer-implemented method of claim 1 wherein determining whether the interactive element is a plug-in instance on the web page further comprises:
   monitoring, by the computing device, for a focus event on the web page;
   receiving, by the computing device, the focus event to define a current location on the web page;
   determining, by the computing device, whether the focus has changed from the current location; and
   responsive to determining that the focus has changed from the current location, determining, by the computing device, whether the focus is on a second interactive element with a static representation.

3. The computer-implemented method of claim 2 wherein responsive to determining that the focus is not on the second interactive element with a static representation, requesting, by the computing device, current state information from the plug-in.

4. The computer-implemented method of claim 3 further comprising:
   storing, by the computing device, the current state information of the plug-in; and
   requesting, by the computing device, a bit-map image representing a current visual state of the plug-in.

5. The computer-implemented method of claim 2 wherein responsive to determining that the focus is on an interactive element with the static representation, further comprises:
   replacing a current bit-map image with a corresponding plug-in.

6. The computer-implemented method of claim 2 wherein responsive to determining that the focus has not changed from the current location, monitoring for a focus event on the web page.

7. The computer-implemented method of claim 1 wherein positioning and sizing the plug-in instance on top of the interactive element on the web page further comprises:
   replacing, by the computing device, the available plug-in instance with a bit-map image representing a current visual state of the plug-in to refrain from displaying the available plug-in instance.

8. A computer program product for plug-in re-use in a web page for simulated simultaneous interactive elements, the computer program product comprising:
   a computer-readable storage medium containing computer executable program code stored thereon, the computer executable program code comprising:
      computer executable program code to determine whether an interactive element is a plug-in instance on a web page;
      computer executable program code to, responsive to a determination that the interactive element is not a plug-in instance on a web page, request current state information of the interactive element from the web page;
      computer executable program code to load the current state information into an available plug-in instance on the web page;
      computer executable program code to position and size the available plug-in instance on top of the interactive element on the web page; and
      computer executable program code to enable interaction with the interactive element.

9. The computer program product of claim 8 wherein computer executable program code to determine whether the interactive element is a plug-in instance on the web page further comprises:
   computer executable program code to monitor for a focus event on the web page;
   computer executable program code to receive the focus event to define a current location on the web page;
   computer executable program code to determine whether the focus has changed from the current location; and
   computer executable program code to, responsive to a determination that the focus has changed from the current location, determine whether the focus is on an interactive element with a static representation.

10. The computer program product of claim 9 wherein computer executable program code to determine that the focus is not on an interactive element with a static representation, further comprises computer executable program code to request current state information from the plug-in.

11. The computer program product of claim 10 further comprising:
   computer executable program code to store the current state information of the plug-in; and
   computer executable program code to request a bit-map image representing a current visual state of the plug-in.

12. The computer program product of claim 9 wherein computer executable program code to determine that the focus is on an interactive element with a static representation, further comprises computer executable program code to replace a current bit-map image with a corresponding plug-in.

13. The computer program product of claim 9 wherein computer executable program code to determine that the focus has not changed from the current location, further comprises computer executable program code for monitoring for a focus event on the web page.

14. The computer program product of claim 8 wherein computer executable program code to position and size the plug-in instance on top of the interactive element on the web page further comprises:
   computer executable program code to replace the plug-in instance with a bit-map image representing a current visual state of the plug-in to refrain from displaying the available plug-in instance.

15. An apparatus comprising:
   a communications bus;
   a memory connected to the communications bus, wherein the memory contains computer executable program code;
   a communications unit connected to the communications bus;
   an input/output unit connected to the communications bus;
   a display connected to the communications bus; and
   a processor unit connected to the communications bus, wherein the processor unit executes the computer executable program code to direct the apparatus to:
      responsive to a determination that an interactive element is not a plug-in instance on a web page, request current state information of the interactive element from the web page;
      load the current state information into an available plug-in instance on the web page;
      position and size the available plug-in instance on top of the interactive element on the web page; and
      enable interaction with the interactive element.

16. The apparatus of claim 15 wherein the processor unit executes the computer executable program code to determine whether the interactive element is a plug-in instance on the web page to further direct the apparatus to:
   monitor for a focus event on the web page;
   receive the focus event to define a current location on the web page;
   determine whether the focus has changed from the current location; and
   responsive to a determination that the focus has changed from the current location, determine whether the focus is on an interactive element with a static representation.

17. The apparatus of claim 16 wherein the processor unit executes the computer executable program code responsive to a determination that the focus is on an interactive element with a static representation, to further direct the apparatus to replace a current bit-map image with a corresponding plug-in.

18. The apparatus of claim 16 wherein the processor unit executes the computer executable program code responsive to a determination that the focus is not on an interactive element with a static representation, to further direct the apparatus to request current state information from the plug-in.

19. The apparatus of claim 18 wherein the processor unit executes the computer executable program code to further direct the apparatus to:
   store the current state information of the plug-in; and
   request a bit-map image representing a current visual state of the plug-in.

20. The apparatus of claim 15 wherein the processor unit executes the computer executable program code to position and size the plug-in instance on top of the interactive element on the web page to further direct the apparatus to:
   replace the available plug-in instance with a bit-map image representing a current visual state of the plug-in to refrain from displaying the available plug-in instance.

* * * * *